US008750656B2

(12) United States Patent
Wu

(10) Patent No.: US 8,750,656 B2
(45) Date of Patent: Jun. 10, 2014

(54) OPTICAL ADAPTER AND OPTICAL SIGNAL TRANSMISSION DEVICE INCLUDING SAME

(75) Inventor: Kai-Wen Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 105 days.

(21) Appl. No.: 13/561,099

(22) Filed: Jul. 30, 2012

(65) Prior Publication Data

US 2013/0308896 A1 Nov. 21, 2013

(30) Foreign Application Priority Data

May 21, 2012 (TW) .............................. 101117943 A

(51) Int. Cl.
*G02B 6/12* (2006.01)
*G02B 6/36* (2006.01)
*G02B 6/42* (2006.01)
*G02B 6/32* (2006.01)

(52) U.S. Cl.
CPC .............. *G02B 6/4214* (2013.01); *G02B 6/12* (2013.01); *G02B 6/12004* (2013.01); *G02B 6/32* (2013.01); *G02B 6/325* (2013.01); *G02B 6/36* (2013.01); *G02B 6/42* (2013.01); *G02B 6/4201* (2013.01); *G02B 6/4204* (2013.01)
USPC ................... 385/14; 385/31; 385/33; 385/39; 385/47; 385/50; 385/88; 385/89; 385/92; 385/93

(58) Field of Classification Search
CPC ........ G02B 6/12; G02B 6/12004; G02B 6/32; G02B 6/325; G02B 6/36; G02B 6/42; G02B 6/4201; G02B 6/4204; G02B 6/4214
USPC .......................................... 385/14, 33, 47, 93
See application file for complete search history.

(56) References Cited

U.S. PATENT DOCUMENTS 4,732,446 A * 3/1988 Gipson et al. .................... 385/24

* cited by examiner

Primary Examiner — Ryan Lepisto
(74) Attorney, Agent, or Firm — Novak Druce Connolly Bove + Quigg LLP

(57) ABSTRACT

An optical adapter includes a loading plate and a coupling lens. The coupling lens includes a main body, a first optical reflector, and a second optical reflector. The first optical reflector is positioned on the loading plate. The main body includes a top plate made of transparent material and spaced a predetermined distance from the loading plate. The second optical reflector is positioned on the first top plate. The first loading plate loads a portion of a planar optical waveguide of an optical printed circuit board. An optical signal from the planar optical waveguide is reflected by the first optical reflector to the second optical reflector, then is reflected by the second optical reflector to the outside of the optical adapter.

18 Claims, 4 Drawing Sheets

OPTICAL ADAPTER AND OPTICAL SIGNAL TRANSMISSION DEVICE INCLUDING SAME

BACKGROUND

1. Technical Field

The present disclosure relates to an optical adapter and an optical signal transmission device including the optical adapter.

2. Description of Related Art

Optical printed circuit boards (OPCB) and optical connectors are usually used in optical signal transmission device. In the OPCB, an optical signal is transmitted along a planar optical waveguide positioned on a first substrate. In the optical connector, an optical signal is transmitted along a top plate above a second substrate. It is not easy to align the planar optical waveguide with the top plate. Therefore, the OPCB cannot communicate with the electrical connector easily.

Therefore, it is desirable to provide an optical adapter and an optical signal transmission device including the optical adapter that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
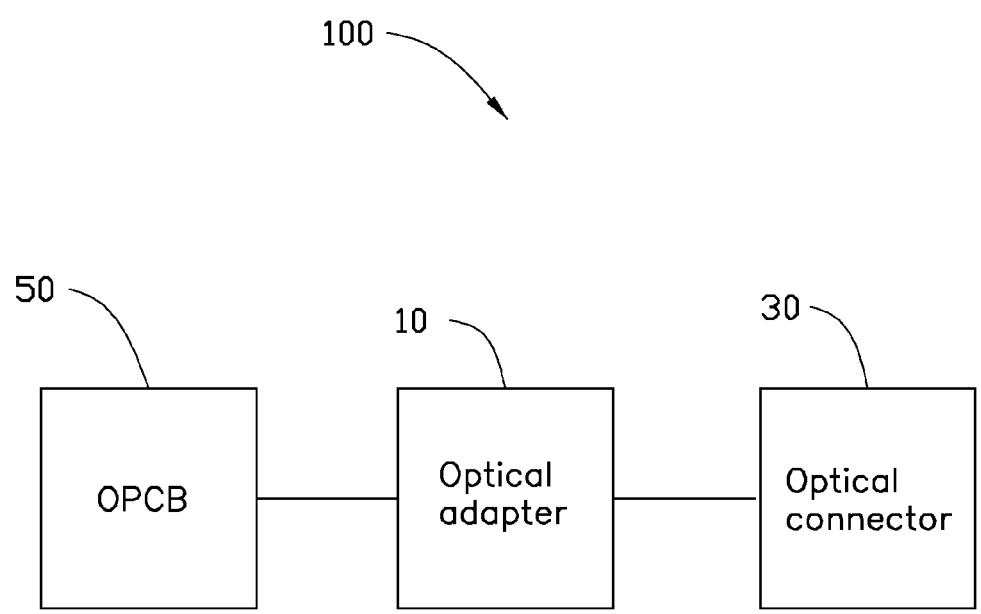
FIG. 1 is a functional block diagram of an optical signal transmission device, according to an exemplary embodiment.

FIG. 1 illustrates an optical signal transmission device 100 in accordance with an embodiment. The optical signal transmission device 100 includes an optical adapter 10, an optical connector 30, and an optical printed circuit board (OPCB) 50.

Figure 2:
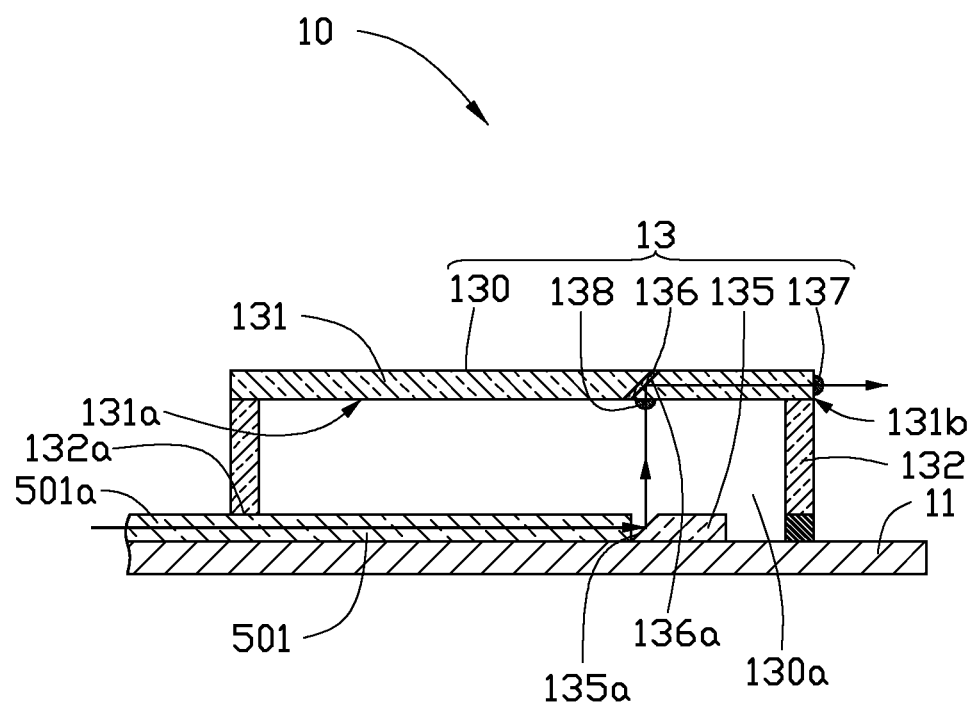
FIG. 2 is a schematic view of an optical adapter of the optical signal transmission device of FIG. 1.
Figure 4:
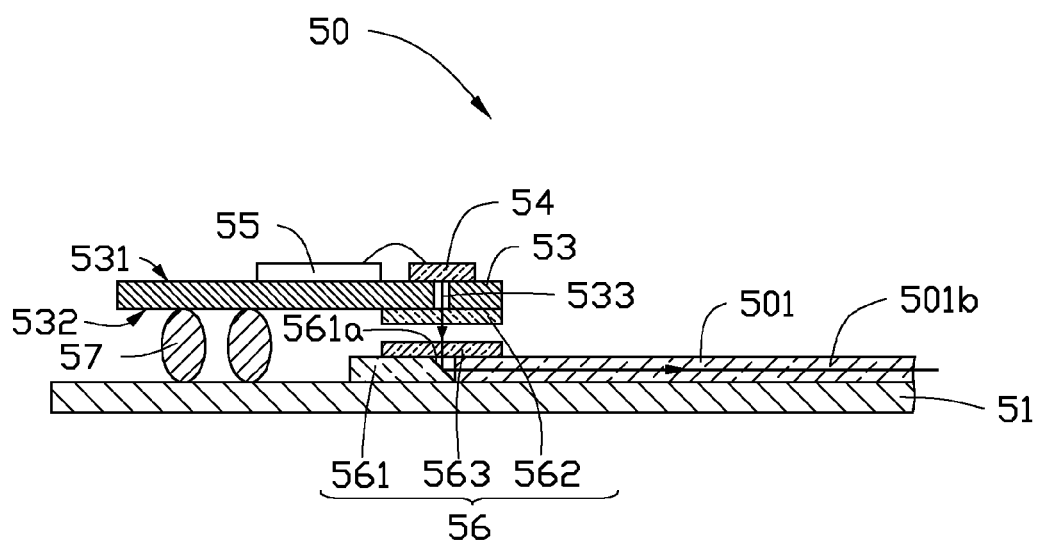
FIG. 4 is a schematic view of an optical printed circuit board (OPCB) of the optical signal transmission device of FIG. 1.

Referring to FIGS. 2 and 4, the OPCB 50 has a planar optical waveguide 501. The planar optical waveguide 501 has a first portion 501a and a second portion 501b.

Referring to FIG. 2, the optical adapter 10 includes a first loading plate 11 and a first coupling lens 13. The first portion 501a of the planar optical waveguide 501 is positioned on the first loading plate 11. The first coupling lens 13 includes a first main body 130, a first optical reflector 135, a second optical reflector 136, a first converging lens 137, and a second converging lens 138.

The first main body 130 is positioned on the first loading plate 11 and defines a first receiving groove 130a facing the loading plate 11. The first main body 130 includes a first top plate 131 and a number of first side plates 132 perpendicularly connected to the first top plate 131. The first top plate 131 is substantially parallel to the first loading plate 11 and is spaced a predetermined distance from the first loading plate 11. The first top plate 131 is made of transparent material and includes a first inner surface 131a and a first outer side surface 131b. The first inner surface 131a faces the first loading plate 11.

The first outer side surface 131b is perpendicular to the first inner surface 131a. The first side plates 132 are positioned on the first loading plate 11 and thus support the first top plate 131.

The first optical reflector 135 is positioned on the first loading plate 11 and is received in the first receiving groove 130a. The first optical reflector 135 includes a first reflecting surface 135a. A first included angle between the first reflecting surface 135a and the first loading plate 11 is about 135 degrees. The second optical reflector 136 is embedded in the first top plate 131. The second optical reflector 136 includes a second reflecting surface 136a opposite to and substantially parallel to the first reflecting surface 135a. A second included angle between the second reflecting surface 136a and the first inner surface 131a is about 45 degrees.

The first converging lens 137 is positioned on the first outer side surface 131b. The first converging lens 137 is used for converging the optical signal reflected by the first reflecting surface 136a to the outside of the first coupling lens 13 and is further used for converging the optical signal from the outside of the first coupling lens 13 to the first reflecting surface 136a.

The second converging lens 138 is positioned on the first inner surface 131a in a light path between the first and second optical reflectors 135, 136. The second converging lens 138 is used for converging the optical signal reflected by the first reflecting surface 135a to the second reflecting surface 136a and is further used for converging the optical signal reflected by the second reflecting surface 136a to the first reflecting surface 135a.

One of the first side plates 132 defines a first through hole 132a at an end adjacent to the first loading plate 11. The planar optical waveguide 501 is positioned on the first loading plate 11 and extends through the first through hole 132a to contact with the first reflecting surface 135a. In other embodiments, the planar optical waveguide 501 also can be spaced at a predetermined distance from the first reflecting surface 135a.

The transmission path of an optical signal of the optical adapter 10 is as follows: the optical signal from the planar optical waveguide 501 is reflected by the first reflecting surface 135a, and is converged by the second converging lens 138, then is reflected by the second reflecting surface 136a to the first converging lens 137, and is converged by the first converging lens 137 to the outside of the first coupling lens 13, and vice versa.

Figure 3:
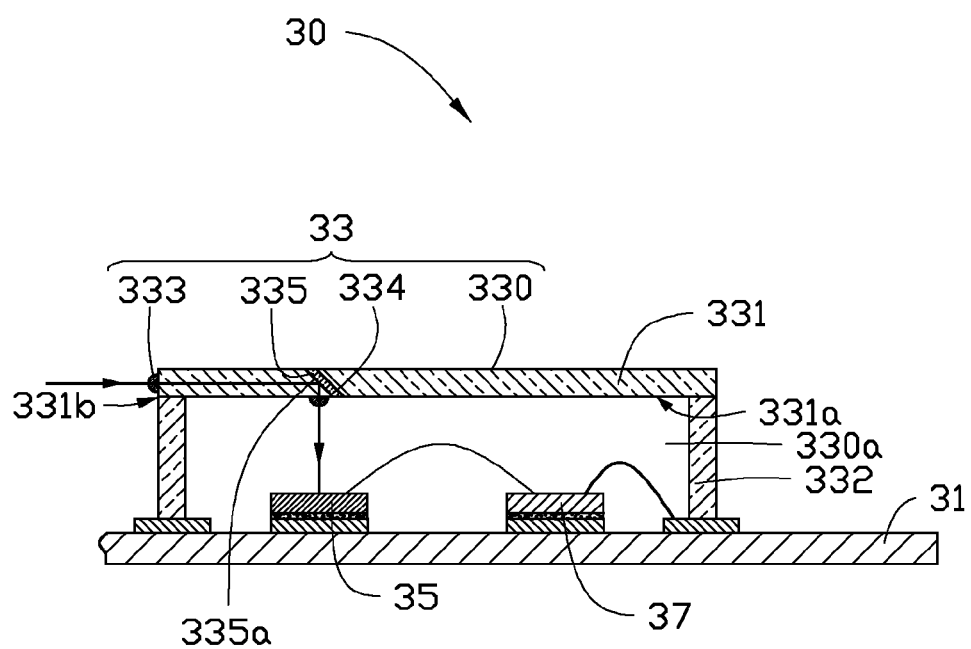
FIG. 3 is a schematic view of an optical connector of the optical signal transmission device of FIG. 1.

Referring to FIG. 3, the optical connector 30 is received in an external device (such as U-disk) and includes a first substrate 31, a second coupling lens 33, a first optical transceiver 35, and a first chip 37.

The second coupling lens 33 includes a second main body 330, a third converging lens 333, a fourth converging lens 334, and a third optical reflector 335. The second main body 330 is positioned on the first substrate 31 and defines a second receiving groove 330a facing the first substrate 31. The second main body 330 includes a second top plate 331 and a number of second side plates 332 perpendicularly connected to the second top plate 331. The second top plate 331 is made of transparent material and is substantially parallel to the first substrate 31. The second top plate 331 includes a second inner surface 331a facing the first substrate 31 and a second outer side surface 331b perpendicular to the second inner surface 331a.

The third converging lens 333 is positioned on the second side surface 331b. The fourth converging lens 334 is positioned on the second inner surface 331a. The third optical reflector 335a is embedded in the second top plate 331 and has a third reflecting surface 335a. An third included angle between the third reflecting surface 335a and the second inner surface 331a is about 45 degrees.

The first optical transceiver 35 and the first chip 37 are positioned on the first substrate 31 and are received in the second receiving groove 330a. The first chip 37 is electrically connected to the first optical transceiver 35. The first chip 37 is used for converting a first optical signal from the first optical transceiver 35 to a first electrical signal and transmitting the first electrical signal to the first substrate 31 and is further used for converting a second electrical signal from the first substrate 31 to a second optical signal and transmitting the second optical signal to the first optical transceiver 35.

The transmission path of an optical signal of the optical connector 30 is as follows: the optical signal from the outside of the second coupling lens 33 is converged by the third converging lens 333, and is reflected by the third optical reflector 335 to the fourth converging lens 334, and at last is converged by the fourth converging lens 334 to the first optical transceiver 35, and vice versa.

Referring to FIG. 4, the OPCB 50 further includes a second substrate 51, a second loading plate 53, a second optical transceiver 54, a second chip 55, and a third coupling lens 56.

The second portion 501b of the planar optical waveguide 501 is positioned on the second substrate 51. The second loading plate 53 and the second substrate 51 are positioned on two opposite sides of the planar optical waveguide 501. The second loading plate 53 is spaced a predetermined distance from the planar optical waveguide 501. The second loading plate 53 has a first surface 531 and a second surface 532. The second loading plate 53 defines a second through hole 533 passing through the first surface 531 and the second surface 532. In this embodiment, the second loading plate 53 is low temperature cofired ceramic (LTCC). The second loading plate 53 is substantially parallel to the second substrate 51. The first surface 531 is substantially parallel to the second surface 532, and the extending direction of the second through hole 533 is substantially perpendicular to the first surface 531 and the second surface 532.

The second optical transceiver 54 is positioned on the first surface 531 and covers the second through hole 533. The second chip 55 is fixed on the first surface 531 and is electrically connected to the second optical transceiver 54. The second chip 55 is used for converting a third optical signal from the second optical transceiver 54 into a third electrical signal and transmitting the third electrical signal to the second loading plate 53. The second chip 55 is further used for converting a fourth electrical signal from the second loading plate 53 into a fourth optical signal and transmitting the fourth optical signal to the second optical transceiver 54.

The third coupling lens 56 includes a fourth optical reflector 561, a fifth converging lens 562, and a sixth converging lens 563. The fourth optical reflector 561 is positioned on the second substrate 51 and has a fourth reflecting surface 561a opposite to the planar optical waveguide 501. A fourth included angle between the fourth reflecting surface 561a and the second substrate 51 is about 135 degrees. In this embodiment, the fourth reflecting surface 561a contacts with the planar optical waveguide 501.

The fifth converging lens 562 is positioned on the second surface 532 and covers the second through hole 533. The fifth converging lens 562 is used for converging the optical signal from the second optical transceiver 54 to the sixth converging lens 562 and further used for converging the optical signal from the sixth converging lens 562 to the second optical transceiver 54. The sixth converging lens 563 is used for converging the optical signal from the fifth converging lens 562 to the fourth optical reflector 561 and further used for converging the optical signal from the fourth optical reflector 561 to the fifth converging lens 562. In this embodiment, two opposite ends of the sixth converging lens 563 are respectively positioned on the planar optical waveguide 501 and the fourth optical reflector 561.

The second loading plate 53 is electrically connected to the second substrate 51 through a ball grid array (BGA) 57.

The transmission path of an optical signal of the OPCB 50 is as follows: the optical signal from the second optical transceiver 54 passes through the second through hole 533 and is converged by the fifth converging lens 562 and the sixth converging lens 563, then is reflected by the fourth optical reflector 561 to the planar optical waveguide 501, and vice versa.

The optical adapter 10 is used for optically coupling the optical connector 30 to the OPCB 50. The first loading plate 11, the first substrate 31, and the second substrate 51 are circuit boards and share a same straight line. The first loading plate 11 is connected between the first substrate 31 and the second substrate 51. The first top plate 131 and the second top plate 331 share a same straight line. The distance between the third converging lens 333 and the first substrate 31 is substantially equal to the distance between the first converging lens 137 and the first loading plate 11, therefore, the first converging lens 137 is optically aligned with the third converging lens 333.

In this embodiment, the optical signal from the optical connector 30 is converged by the third converging lens 333 and the first converging lens 137 to enter the optical adapter 10, then the optical signal enters the planar optical waveguide 501, and at last enters the OPCB 50, and vice versa.

In other embodiments, the first substrate 11 and the second substrate 51 also can be integrally formed.

In other embodiments, the first converging lens 137 and the third converging lens 333 can be omitted, and the distance between the first top plate 131 to the first loading plate 11 is substantially equal to the distance between the second top plate 331 and the first substrate 31, therefore, the optical signal reflected by the second optical reflector 136 can directly arrive at the third optical reflector 335.

In other embodiments, the second converging lens 138 and/or the fourth converging lens 334 can be omitted.

By employing the optical adapter 10, the transmitting direction of the optical signal from the planar optical waveguide 501 can be changed upward, and emit along the second top plate 331, because the first top plate 131 of the optical adapter 10 and the second top plate 331 are coaxial, therefore, the optical signal can enter the optical connector 30. Therefore, the OPCB 50 can be easily optically communicated with the optical connector 30.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:
1. An optical adapter, comprising:
   a first loading plate configured for loading a first portion of a planar optical waveguide of an optical printed circuit board (OPCB); and
   a first coupling lens comprising:
      a first main body comprising a first top plate made of transparent material, the first top plate spaced a deter- mined distance from the first loading plate, the first top plate comprising a first inner surface facing the first loading plate;
a first optical reflector positioned on the first loading plate;
a second optical reflector embedded in the first top plate; and
a first converging lens positioned on the first inner surface;
wherein optical signals from the planar optical waveguide are reflected by the first optical reflector to the second optical reflector, then reflected by the second optical reflector, and finally transmitted by the first top plate to the outside of the optical adapter.

2. The optical adapter of claim 1, wherein the first top plate comprises a first outer side surface perpendicular to the first inner surface.

3. The optical adapter of claim 2, further comprising a second converging lens positioned on the first outer surface, wherein the second converging lens is configured for converging the optical signals from the first top plate to the outside of the optical adapter and further configured for converging optical signals from the outside of the optical adapter to the first top plate, then to the second optical reflector.

4. The optical adapter of claim 1, wherein the first converging lens is configured for converging the optical signals reflected by the first optical reflector to the second optical reflector and is further configured for converging the optical signals reflected by the second optical reflector to the first optical reflector.

5. The optical adapter of claim 1, wherein the first main body further comprises a plurality of first side plates, the first side plates support the first top plate, one of the first side plates defines a through hole for receiving the planar optical waveguide, the planar optical waveguide is optically aligned with the first optical reflector.

6. The optical adapter of claim 1, wherein the first optical reflector has a first reflecting surface, an included angle between the first reflecting surface and the first loading plate is about 135 degrees, the second optical reflector has a second reflecting surface substantially parallel to the first reflecting surface.

7. An optical signal transmission device, comprising:
an optical adapter, comprising:
a first loading plate; and
a first coupling lens comprising:
a first main body comprising a first top plate made of transparent material, the first top plate spaced a determined distance from the first loading plate;
a first optical reflector positioned on the first loading plate; and
a second optical reflector embedded in the first top plate;
an optical connector comprising:
a first substrate;
a second coupling lens comprising:
a second main body having a second top plate made of transparent material, the second top plate spaced a first predetermined distance from the first substrate;
a third optical reflector embedded in the second top plate; and
a first optical transceiver positioned on the first substrate; and
an optical printed circuit board comprising:
a planar optical waveguide comprising a first portion and a second portion, the first portion being loaded on the first loading plate of the optical adapter and optically coupled with the first optical reflector;
a second substrate loading a second portion of the planar optical waveguide,
a second loading plate positioned at an opposite side of the planar optical waveguide with respect to the second substrate, the second loading plate spaced a second predetermined distance with the second substrate and electrically connected to the second substrate;
a second optical transceiver positioned on a surface of the second loading plate away from the planar optical waveguide; and
a third coupling lens comprising:
a fourth optical reflector positioned on the second substrate and optically coupled with the second portion of the planar optical waveguide;
wherein the first loading plate, the first substrate, and the second substrate share a same straight line; the first loading plate is connected between the first substrate and the second substrate; the first top plate and the second top plate share a same straight line, a distance between the second top plate and the first substrate is substantially equal to a distance between the first top plate and the first loading plate, thus an optical signal from the second optical transceiver is reflected by the fourth optical reflector to the planar optical waveguide, then is reflected by the first optical reflector and the second optical reflector to the third optical reflector, finally the optical signal is reflected by the third optical reflector to the first optical transceiver.

8. The optical signal transmission device of claim 7, wherein the first top plate comprises a first inner surface and a first outer side surface perpendicular to the first inner surface, the first inner surface faces the first loading plate.

9. The optical signal transmission device of claim 8, further comprising a first converging lens positioned on the first outer surface.

10. The optical signal transmission device of claim 8, further comprising a second converging lens positioned on the first inner surface, wherein the second converging lens is configured for converging the optical signal reflected by the first optical reflector to the second optical reflector and is further configured for converging the optical signal reflected by the second optical reflector to the first optical reflector.

11. The optical signal transmission device of claim 7, wherein the first main body further comprises a plurality of first side plates, the first side plates support the first top plate, one of the first side plates defines a first through hole receiving the first portion of the planar optical waveguide.

12. The optical signal transmission device of claim 7, wherein the first optical reflector has a first reflecting surface, an included angle between the first reflecting surface and the first loading plate is about 135 degrees, the second optical reflector has a second reflecting surface substantially parallel to the first reflecting surface.

13. The optical signal transmission device of claim 7, wherein the second top plate has a second inner surface facing the first substrate and a second outer side surface perpendicular to the second inner surface.

14. The optical signal transmission device of claim 13, wherein the optical connector further comprises a third converging lens positioned on the second outer side surface, the third coupling lens is optically aligned with the first coupling lens.

15. The optical signal transmission device of claim 13, wherein the optical connector further comprises a fourth converging lens positioned on the second inner surface, the fourth converging lens is configured for converging the optical signal reflected by the third optical reflector to the first optical transceiver and is further used for converging the optical signal from the first optical transceiver to the third optical reflector.

16. The optical signal transmission device of claim 7, wherein the second loading plate defines a second through hole for allowing the optical signal from the second optical transceiver to pass through.

17. The optical signal transmission device of claim 16, wherein the third coupling lens further comprising a fifth converging lens and a sixth converging lens, the fifth converging lens is positioned on another surface of the second loading plate away from the second transceiver and covers the second through hole, the sixth converging lens is optically aligned with the fifth converging lens and the fourth optical reflector and is spaced a third predetermined distance from the fifth converging lens, the optical signal from the second optical transceiver passes through the fifth converging lens and the sixth converging lens to the fourth optical reflector.

18. The optical signal transmission device of claim 17, wherein two opposite ends of the sixth converging lens are positioned on the fourth optical reflector and the second portion of the planar optical waveguide respectively.

\* \* \* \* \*